United States Patent
Grabbe et al.

(10) Patent No.: US 11,550,023 B2
(45) Date of Patent: Jan. 10, 2023

(54) LOCATION SYSTEM FOR POSITION DETERMINATION IN ONE GOODS LOGISTICS DEVICE AND METHOD OF OPERATION SAME

(71) Applicant: Jungheinrich AG, Hamburg (DE)

(72) Inventors: Florian Grabbe, Hamburg (DE); Stefan Ahrens, Rellingen (DE); Sven-Ole Heise, Osterrönfeld (DE); Jan Kopelke, Hamburg (DE); Tony Altmann, Brokstedt (DE)

(73) Assignee: Jungheinrich AG, Hamburg (DE)

( * ) Notice: Subject to any disclaimer, the term of this patent is extended or adjusted under 35 U.S.C. 154(b) by 964 days.

(21) Appl. No.: 16/292,606

(22) Filed: Mar. 5, 2019

(65) Prior Publication Data

US 2019/0274008 A1    Sep. 5, 2019

(30) Foreign Application Priority Data

Mar. 5, 2018 (DE) ................... 10 2018 104 994.3

(51) Int. Cl.
*G01S 5/02* (2010.01)
*H04W 4/029* (2018.01)
*H04W 4/02* (2018.01)
*H04W 64/00* (2009.01)

(52) U.S. Cl.
CPC ............ *G01S 5/0284* (2013.01); *G01S 5/021* (2013.01); *H04W 4/025* (2013.01); *H04W 4/029* (2018.02); *H04W 64/006* (2013.01)

(58) Field of Classification Search
CPC ........... G01S 5/0284–0289; G01S 5/21; G01S 1/022; G01S 5/021; H04W 64/003
See application file for complete search history.

(56) References Cited

U.S. PATENT DOCUMENTS

| | | | |
|---|---|---|---|
| 7,123,925 B2* | 10/2006 | Robinson | G01S 5/0289 455/456.1 |
| 9,310,463 B2* | 4/2016 | Pandey | H04W 64/003 |
| 9,930,541 B2* | 3/2018 | Rautiainen | H04W 24/00 |
| 2008/0220780 A1 | 9/2008 | Huseth et al. | |
| 2008/0309556 A1 | 12/2008 | Hohl | |
| 2013/0010617 A1 | 1/2013 | Chen et al. | |
| 2018/0231668 A1 | 8/2018 | Xia et al. | |

FOREIGN PATENT DOCUMENTS

| | | |
|---|---|---|
| EP | 1617601 A2 | 1/2006 |
| EP | 1821116 A1 | 8/2007 |
| WO | 2017024462 A1 | 2/2017 |

OTHER PUBLICATIONS

A. Franz et al. "Integration of positioning capability into an existing active RFID-system", IDE0424, Jun. 2014, pp. 1-78, Master's Thesis in Computer System Engineering, School of Information Science, Computer and Electrical Engineering Halmstad University, Sweden.

* cited by examiner

*Primary Examiner* — Cassi J Galt
(74) *Attorney, Agent, or Firm* — Rankin, Hill & Clark LLP

(57) ABSTRACT

A positioning system for position determination in a goods logistics facility and a method for operating same. The positioning system includes a plurality of permanently installed anchor nodes that represent reference points in a common coordinate system. The positioning system is configured to determine a distance from a first anchor node to a second anchor node.

12 Claims, 3 Drawing Sheets

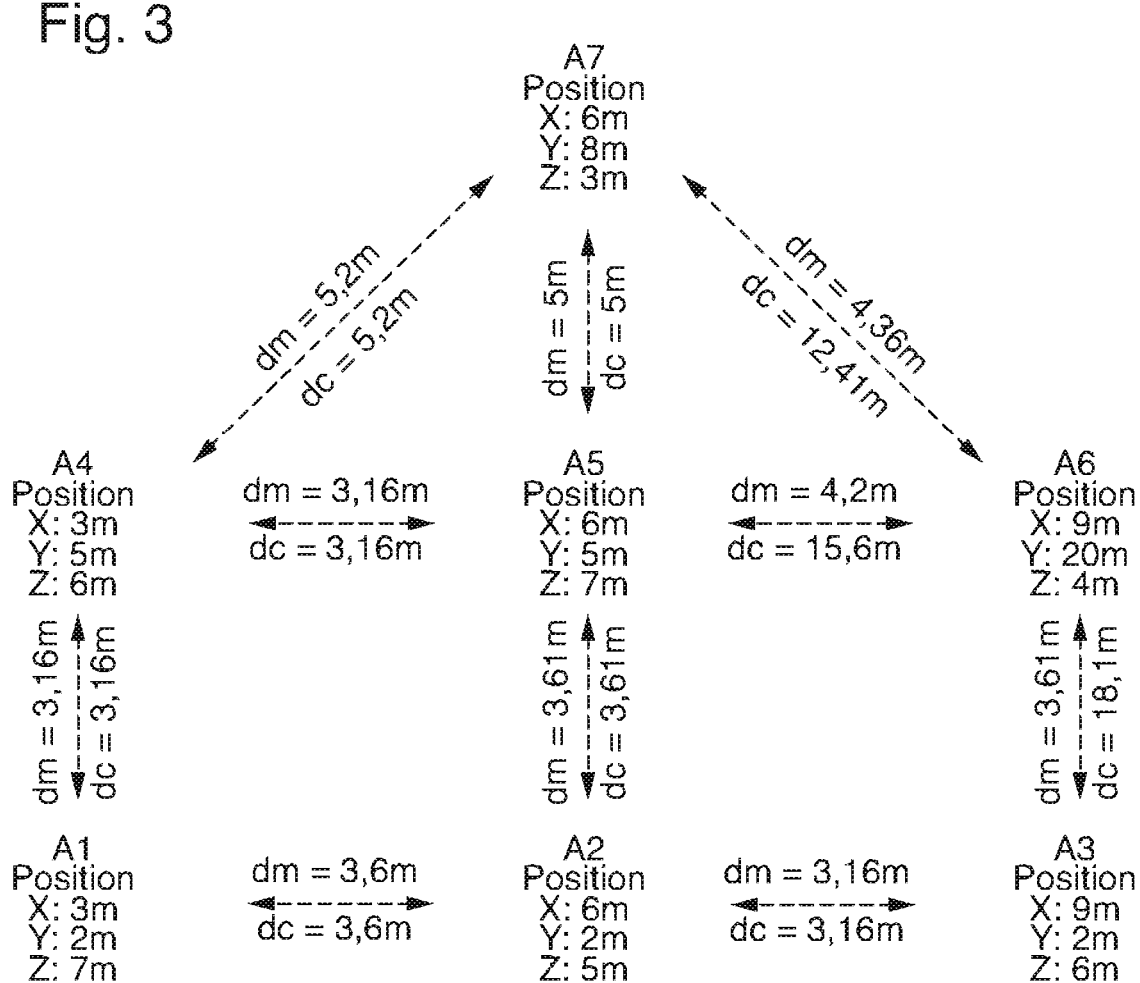

LOCATION SYSTEM FOR POSITION DETERMINATION IN ONE GOODS LOGISTICS DEVICE AND METHOD OF OPERATION SAME

PRIORITY CLAIM

This application claims priority to DE 10 2018 104 994.3, filed Mar. 5, 2018, which is hereby incorporated by reference in its entirety.

BACKGROUND OF INVENTION

Field of Invention

The invention relates to a positioning system for position determination in a goods logistics facility, including a plurality of permanently installed anchor nodes that represent reference points in a common coordinate system. The invention further relates to a method for operating a positioning system in a goods logistics facility, including a plurality of permanently installed anchor nodes that represent reference points in a common coordinate system.

Brief Description of Related Art

Positioning systems for determining the position of mobile units, such as WLAN transponders, are known in many fields and also in goods logistics. A system of this kind is also referred to as an "indoor positioning system." The transponders used for position determination are located in a user end device, for example. Equally, transponders may be provided on or in a product, container or packaging unit. Industrial trucks or the like may also be equipped with corresponding transponders. All of these units should be considered mobile units within the context of the present description.

However, a positioning system of this kind is not restricted to determining positions inside a building, even though this is a common application thereof. Similarly, position determination may also be carried out in an open space, for example.

A permanently installed network of reference points, e.g., WLAN access points or the like, is used for the position determination. The position of a mobile unit is determined by multilateration, i.e., of a measurement of distance to three different points, in this case the reference points of the system. Position determination is also possible based on a measurement of distance to two points, provided that one of the two points of intersection of the distance circles can be excluded on the basis of existing additional information. This is the case, for example, when the two reference points are at the edge of an acquisition range and thus the second point of intersection located outside the acquisition range can be excluded. The distance is measured by means of a propagation delay measurement, for example. The reference points shall be referred to as anchor nodes. The positions thereof, which are assumed to be known, serve as reference points in a common coordinate system. The anchor nodes are thus represented and/or referenced in a common coordinate system. In order that the anchor nodes used as reference points may also serve as fixed points for determining an absolute location within the common coordinate system, the positions of the anchor nodes must be determined when configuring the positioning system. This procedure is carried out several times manually and is therefore time-consuming and prone to errors.

An object of the present invention is to provide a positioning system for position determination in a goods logistics facility as well as a method for operating such a positioning system, the positioning system being less prone to errors with regard to the position of the anchor nodes. The object is solved by means of a positioning system as described and claimed herein.

BRIEF SUMMARY OF THE INVENTION

A positioning system for position determination in a goods logistics facility is provided, and includes a plurality of permanently installed anchor nodes that represent reference points in a common coordinate system, the positioning system being further developed in that it is configured to determine a distance from a first anchor node to at least one second anchor node.

The measurement of distance between the first and the second anchor node may be carried out multiple times, i.e., it can be repeated. When carrying out repeated distance measurements, an average may be calculated, making the measured value of the distance more accurate.

The positioning system is in particular a positioning system for determining the position of at least one mobile unit in the goods logistics facility. In particular, the positioning system is further configured to determine a position of the mobile unit within the coordinate system by measuring the distance to a plurality of anchor nodes.

It is further provided, in particular, that several distance measurements are carried out, where a distance from the first anchor node to a plurality of second anchor nodes is being determined in each case.

In order to determine a position of the mobile unit within the coordinate system, the distance thereof from various anchor nodes is measured. The position is determined, for example, by means of multilateration and/or trilateration. In the case of multilateration, a point of intersection of several distance circles is determined, and in the case of trilateration, there are three distance circles.

Strictly speaking, these distance circles are spherical. However, it may also be assumed that the anchor nodes are all located at least approximately at the same height and that the mobile unit, such as an industrial truck, moves in only one plane. These circumstances demonstrate the fundamentally three-dimensional problem of position determination within the context of a single plane, and the point of intersection of the distance circles can be seen in this plane.

The mobile unit is an industrial truck, for example. However, it is also provided that the mobile unit is a user end device, for example a smartphone that is equipped with corresponding software (app). Furthermore, the mobile unit may for example be a unit of goods that is provided with a transponder or the like.

WLAN transponders or base stations, for example, may be used as anchor nodes in order to determine distance and/or position. Accordingly, the mobile unit also includes a WLAN transponder. It is also possible to use another generally known form of technology as the basis for the positioning system, such as that typically used for so-called "indoor positioning systems."

It is further provided in particular that the positioning system is based on ultra-wideband technology (UWB technology). Accordingly, UWB transponders or base stations are used as anchor nodes in order to determine distance and/or position, and the mobile unit also includes a UWB transponder.

Advantageously, by means of the positioning system according to aspects of the invention, it is possible to check the position of anchor nodes and thus the reference system. The reliability and accuracy of the positioning system is improved, and a consistently high positioning quality can be ensured.

Errors when calibrating a position of an anchor node have a direct influence on the position determination and thus on the positioning quality. It is possible that, during manual calibration of the anchor nodes, inadvertently false positions are assigned, which can significantly disrupt the position determination/positioning. Such errors can be located quickly and efficiently in the positioning system according to aspects of the invention.

Furthermore, undesired changes in the position of the anchor nodes may occur, for example by means of a collision. Even anchor nodes such as these can be located, and therefore a consistently high positioning quality can be ensured. Finally, it is possible to establish whether an anchor node has failed.

All of these technical disadvantages present in conventional systems have been overcome in the positioning system according to aspects of the invention.

According to one embodiment, the positioning system is further developed in that the permanently installed anchor nodes have each been assigned a position within the coordinate system, and in that the positioning system is configured to measure the distance between a first anchor node and a second anchor node and to compare the measured distance value with a computed distance value, the computed distance value being calculated from the assigned position of the first anchor node and the assigned position of the second anchor node within the coordinate system, and to define a deviation between the measured distance value and the computed distance value as a plausibility criterion, and if the deviation exceeds a predetermined threshold value, to classify the assigned position of the first and/or second anchor node as implausible.

In order to carry out the necessary calculations and above all the distance measurement, the positioning system includes a suitable central processing unit, for example a computer or a workstation. The necessary calculations may also be carried out decentrally, for example in the anchor nodes or even in the mobile unit.

It is further provided in particular that a maintenance message is generated within the positioning system for anchor nodes whose position is classified as implausible. It is therefore possible to check the position of the anchor node in question in a targeted manner and, if necessary, to correct it. Such highly target-oriented maintenance of the positioning system saves time and money.

The positioning system is in particular further developed in that the positioning system is further configured to measure the distance between a number of predetermined anchor nodes and the neighboring anchor nodes in each case, and to classify the positions of an anchor node as implausible if the measured distance value deviates from the computed distance value by more than the predetermined threshold value and if such a deviation is present for more than one neighboring anchor node.

The predetermined anchor nodes are, for example, anchor nodes in a selected region or particular portion of the positioning system. For example, a hall or a particular open space of a goods logistics facility may be provided for the purpose of checking. The number of predetermined anchor nodes may be one, it may be a subset of the total number of anchor nodes present in the positioning system, or it may be identical to the total number of anchor nodes present. In the latter case, all anchor nodes of the system are checked.

If there is a deviation for a plurality of neighboring anchor nodes, it can be concluded with near certainty that the anchor node that produces distance values that deviate in each case with respect to its nearest neighbor has been provided with incorrect position information. As a result, incorrectly calibrated anchor nodes, inadvertently displaced anchor nodes, and defective anchor nodes, for example, can be identified quickly and reliably.

The positioning system is further developed in particular in that verified anchor nodes whose positions are classified as plausible and at least one added anchor node are included, the positioning system further being configured to measure the distance between the at least one added anchor node and the neighboring verified anchor nodes and to classify a position assigned to the added anchor node as implausible if the measured distance value deviates from the computed distance value by more than the predetermined threshold value.

A position is considered to be plausible if the deviation between the computed value and the measured value is below the predetermined threshold value for all neighbors. It is particularly advantageous to check an added anchor node, because the position assignment is carried out manually many times and is therefore prone to errors.

According to another embodiment, it is provided that the positioning system is further configured to carry out the at least one distance measurement upon request or at regular predefined time intervals.

By checking the reference system at regular intervals, or by checking the reference system of the positioning system upon request, it is possible to maintain a high level of quality for the reference system in a simple, quick and reliable manner. The quality of the positioning can overall be improved if regular automatic reference system checks are possible and carried out. Within the scope of a quality assurance step of this kind, it is also possible to identify failed anchor nodes.

The neighboring anchor nodes are, for example, the other anchor nodes of the system located within a reception or transmission and reception range of the first anchor node. Depending on the arrangement, a smaller number of anchor nodes may also be defined as closest neighbors. If the anchor nodes are arranged in a regular quadratic grid, this may for example be the four closest neighbors.

It is also preferably provided that the anchor nodes of the positioning system between which a distance is determined are in direct visual contact with one another. In other words, there is no obstacle between the anchor nodes along a direct connection line. This prevents or reduces the occurrence of faulty measurements, for example due to reflections.

According to another embodiment, it is provided that, in the event that the anchor nodes of the positioning system between which a distance is determined are not in direct visual contact with one another, predetermined attenuation constants are taken into consideration when determining the distance. Such attenuation constants are known for all conventional radio technologies and materials, and therefore the distance to an anchor node on the opposite side of a wall, for example, can also be determined accurately.

The positioning system is further developed in particular in that the plurality of anchor nodes includes a first and a second group of anchor nodes, the first group of anchor nodes having been assigned one position in each case and the second group of anchor nodes having been assigned no position in each case, the positioning system further being configured to determine distances between a first anchor node of the second group and at least three different second anchor nodes of the first group, to calculate a position of the first anchor node based on these distances, and to assign the computed position to the first anchor node.

The first group of anchor nodes is in particular a subset of the plurality of anchor nodes. The second group of anchor nodes is a subset of the plurality of anchor nodes. The first and the second groups are two sets that do not overlap.

A positioning system according to the above-mentioned embodiment allows for automatic and autonomous set up and expansion of the reference system. Advantageously, the added anchor nodes do not have to be calibrated manually. Manually calibrating a large number of anchor nodes is laborious and cost-intensive. The positions of the added anchor nodes are automatically determined based on a minimum number of initial anchor nodes, the positions of which are known. The reference system is set up in this manner very quickly and is less prone to errors than manual calibration of the added anchor nodes.

The object is further solved by means of a method for operating a positioning system in a goods logistics facility, including a plurality of permanently installed anchor nodes that represent reference points in a common coordinate system, the method being further developed in that a distance from a first anchor node to at least one second anchor node is determined.

The same or similar advantages apply to the method as were previously mentioned with respect to the positioning system itself, and therefore repetitions will be omitted.

The method is in particular a method for operating a positioning system for determining the position of at least one mobile unit. Furthermore, within the scope of the method, a position of the mobile unit within the coordinate system, in particular, is determined by measuring the distance to a plurality of anchor nodes.

The method is in particular further developed in that a position within the coordinate system has been or is assigned to each of the permanently installed anchor nodes and the method includes the following steps: measuring a distance between a first anchor node and a second anchor node, computing a distance value from the assigned position of the first anchor node and the assigned position of the second anchor node within the coordinate system, comparing the measured distance value with the computed distance value, and classifying the assigned position of the first and/or second anchor node as implausible if a deviation between the measured distance value and the computed distance value is greater than a predetermined threshold value.

This method is advantageously further developed in that a distance between a number of predetermined anchor nodes and the neighboring anchor nodes is measured in each case and the positions of an anchor node are classified as implausible if the measured distance value deviates from the computed distance value by more than the predetermined threshold value and if such a deviation is present for more than one neighboring anchor node.

According to another advantageous embodiment, the method is further developed in that verified anchor nodes whose positions are classified as plausible and at least one added anchor node are included in the positioning system, the distance between at least one added anchor node and neighboring verified anchor nodes being measured and a position assigned to the added anchor node being classified as implausible if the measured distance value deviates from the computed distance value by more than the predetermined threshold value.

It is further provided in particular that the at least one distance measurement is carried out upon request or at regular predefined time intervals.

The same or similar advantages as already mentioned with reference to the corresponding embodiments of the positioning system also apply to the embodiments mentioned above.

The method is further developed in particular in that the plurality of anchor nodes includes a first and a second group of anchor nodes, the first group of anchor nodes being assigned or having been assigned a position in each case and the second group of anchor nodes being assigned or having been assigned no position in each case, the method including the following steps: determining distances between a first anchor node of the second group and at least three different second anchor nodes of the first group, computing a position of the first anchor node based on these distances and assigning the computed position to the anchor node.

The method according to this embodiment advantageously allows for automatic setup of a reference system of a positioning system.

Further features of the invention will become apparent from the description of embodiments according to the invention together with the claims and the attached drawings. Embodiments according to the invention can fulfill individual features or a combination of several features.

BRIEF DESCRIPTION OF THE DRAWINGS

The invention is described below, without restricting the general idea of the invention, using exemplary embodiments with reference to the drawings, express reference being made to the drawings with regard to all details according to the invention that are not explained in greater detail in the text. In the following:

FIG. 3 shows a simplified schematic representation of a check of positions already assigned to anchor nodes in a positioning system.

In the drawings, the same or similar elements and/or parts are provided with the same reference numbers in order to prevent the item from needing to be reintroduced.

DETAILED DESCRIPTION OF THE INVENTION

Figure 1:
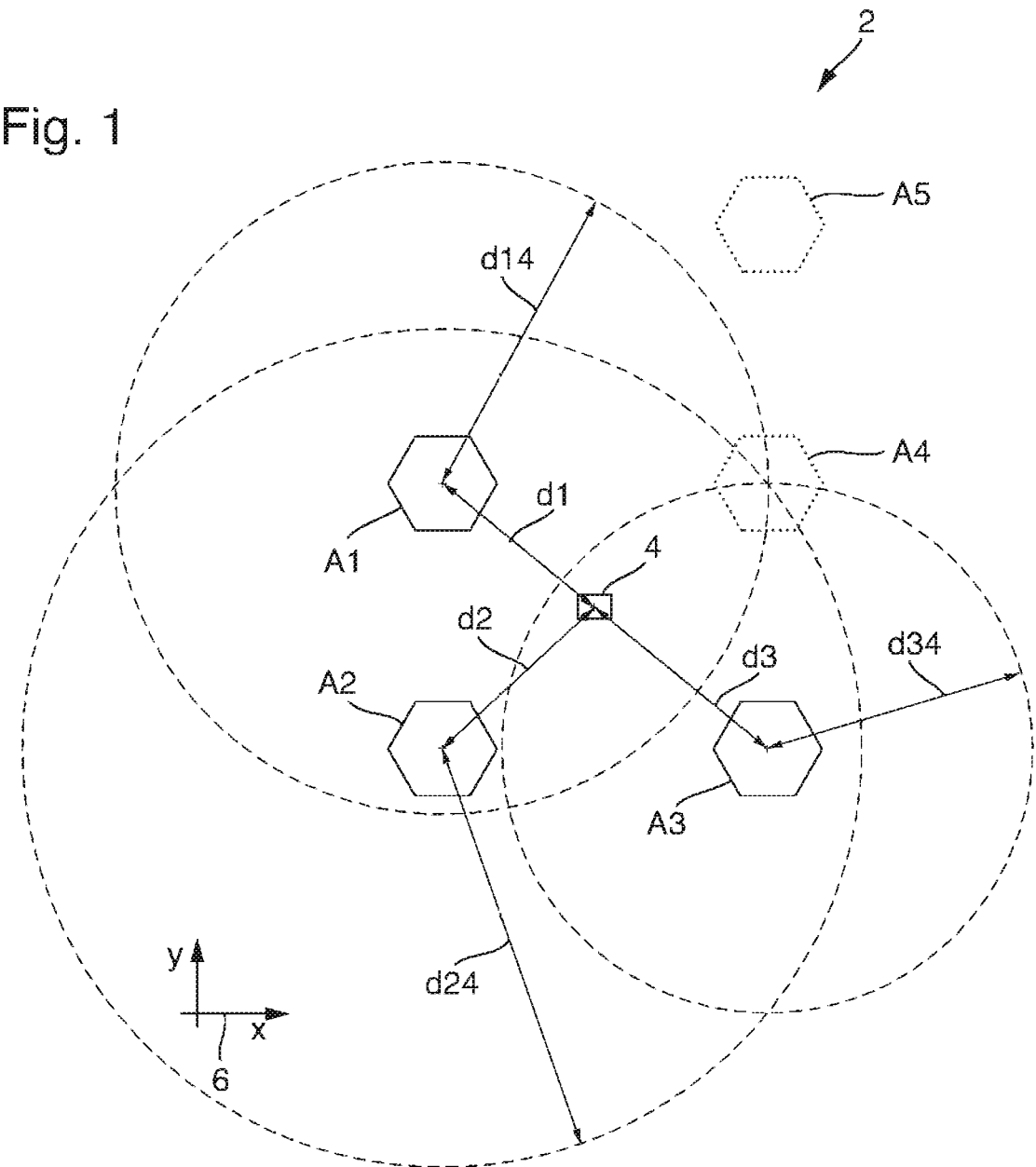
FIGS. 1 and 2 each show a simplified schematic representation of a positioning system in which a distance measurement between anchor nodes is carried out in order to determine a position of an anchor node which has not yet been assigned any position.

FIG. 1 shows a simplified schematic representation of a positioning system 2 for determining the position of a mobile unit 4 in a goods logistics facility. The mobile unit 4 may be a user end device, for example a smartphone that is equipped with corresponding software (app). The mobile unit 4 may also be an industrial truck that is provided with a transponder or the like. The positioning system 2 includes a plurality of permanently installed anchor nodes A1-A5. The anchor nodes A1-A5 form reference points within a common coordinate system 6, i.e., the positions of the anchor nodes A1-A5 are shown as coordinates in said common coordinate system 6. The positioning system 2 is configured to determine a position of the mobile unit 4 within the coordinate system 6. For this purpose, the distances between the mobile unit 4 and a plurality of anchor nodes A1-A5 is measured.

If the positioning system 2 is operating within one plane, as is often the case, and if the anchor nodes A1-A5 are all attached at approximately the same height, measuring the distance to three anchor nodes A1-A3 is sufficient to be able to ascertain the position of the mobile unit 4.

A positioning system 2 in which the position of the mobile unit 4 is determined by measuring the distance to the anchor nodes A1-A3 is shown by way of example in FIG. 1. The distances d1, d2 and d3 are measured. The distances are measured by means of a propagation delay measurement, for example. A method of this kind is generally known as multilateration or trilateration.

The positioning system 2 is further configured to determine a distance between the anchor nodes A1-A5, for example a distance between two anchor nodes. For example, the distance between the first anchor node A1 and the fourth anchor node A4 may be determined. The distance between the first and the fourth anchor node A1, A4 is plotted as a distance circle having the diameter d14 in FIG. 1. Similarly, the distance between the second anchor node A2 and the fourth anchor node A4 may also be determined. The corresponding distance circle having the diameter d24 is also shown. The position of the fourth anchor node A4 cannot yet be clearly determined from the two values of the distances d14 and d24 within one plane, because the two circles have two points of intersection. For this reason, another anchor node is added and the distance between the third anchor node A3 and the fourth anchor node A4 is measured. This produces a distance circle having the diameter d34. Using the points of intersection of the three distance circles, the position of the fourth anchor node A4 can be clearly determined. It is therefore possible to deduce a position of another anchor node, in this case the fourth anchor node A4, based on the positions of the three anchor nodes A1, A2 and A3 that are presumed to be known. This information can be used for various purposes.

By way of example, the plurality of anchor nodes A1-A5 of the positioning system 2 is divided into a first group of anchor nodes and a second group of anchor nodes. The three anchor nodes A1, A2 and A3 form the first group in the exemplary embodiment shown. These anchor nodes A1, A2, A3 have each been assigned a position, which is why they are drawn in a solid line. By way of example, the three anchor nodes A1, A2 and A3 have been assigned a position within the common coordinate system 6 by means of manual calibration. The second group of anchor nodes includes the two anchor nodes A4 and A5, which have not yet been assigned a position. The positioning system 2 is configured to determine the distance between the three anchor nodes A1, A2 and A3 of the first group and the anchor node A4 of the second group. These are the distances d14, d24 and d34. Based on these distances d14, d24, d34, the position of the fourth anchor node A4 can be calculated. In a subsequent step, the anchor node A4 is assigned the computed position.

Figure 2:
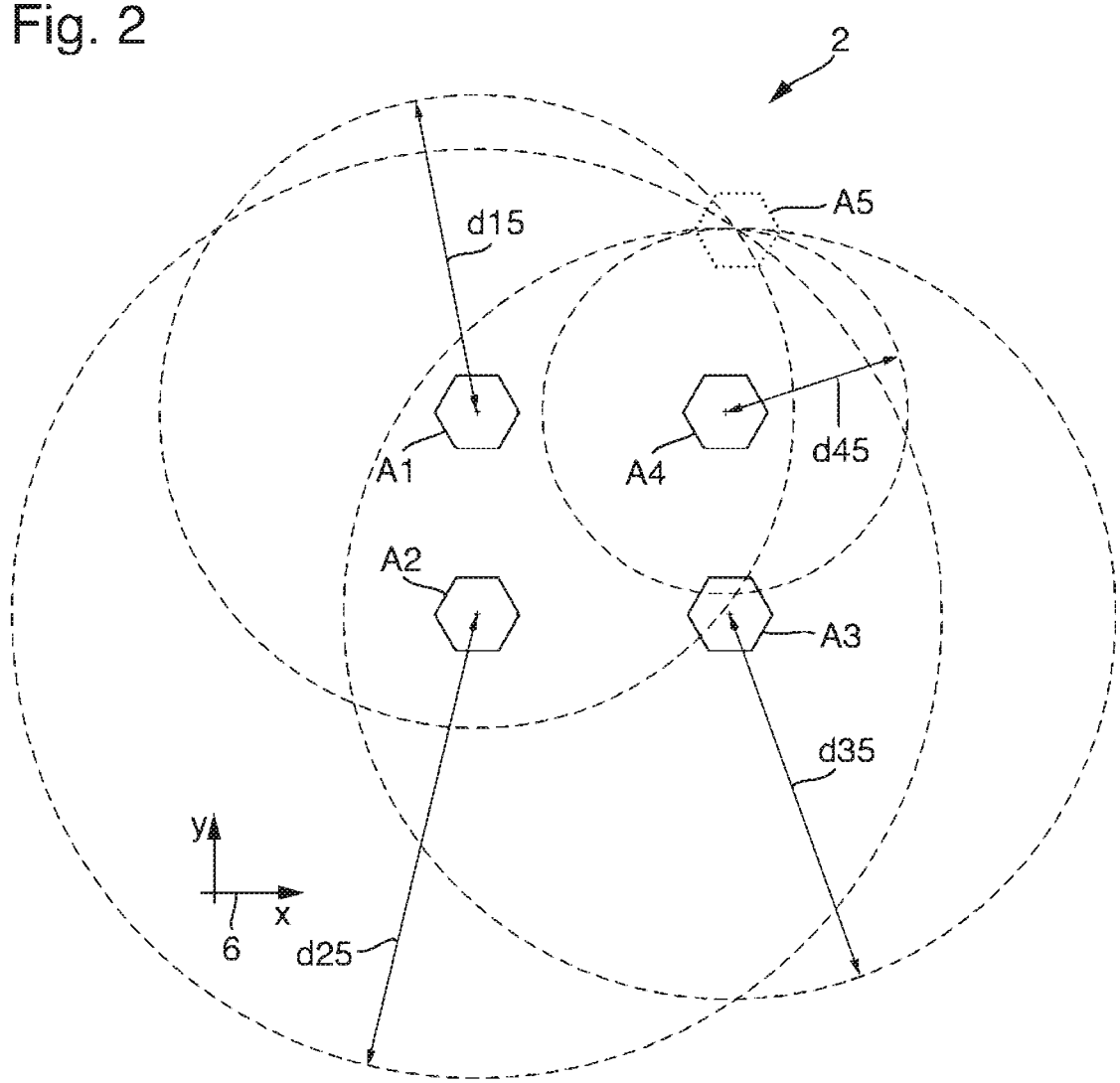

FIG. 2 illustrates the further expansion of the system. In the positioning system 2 shown here, the four anchor nodes A1 to A4 have each already been assigned permanent positions within the common coordinate system 6. The position assigned to the fourth anchor node A4 is, for example, the previously calculated one. Here, the four anchor nodes A1 to A4 that have already been assigned a position form the first group. The second group merely includes the fifth anchor node A5 in the example shown. Here, the distances between the four anchor nodes A1 to A4 of the first group and the fifth anchor node A5, specifically the distances d15, d25, d35 and d45, are determined. In this case, the position of the fifth anchor node A5 within the common coordinate system 6 is overdetermined, which actually produces a higher degree of accuracy. Based on the values of the distances d15, d25, d35 and d45 and the knowledge of the positions of the four anchor nodes A1 to A4 within the common coordinate system 6, the position of the fifth anchor node A5 within the common coordinate system 6 can be determined. The computed position is then assigned to the anchor node A5.

As explained above with reference to FIGS. 1 and 2, a reference system of the positioning system 2 can be automatically set up, successive anchor nodes being assigned computed positions within the common coordinate system 6.

It is further provided that the positioning system 2 includes permanently installed anchor nodes A1 to A7, which have each already been assigned a position within the common coordinate system 6. This is illustrated in the schematic representation in FIG. 3.

The positions of the anchor nodes A1 to A7 are in each case specified as X, Y and Z coordinates within the common coordinate system 6. The positioning system 2 is configured to measure the distance between a first anchor node, for example the anchor node A4, and a second anchor node, for example the anchor node A7. The measured distance is denoted by dm and may be 5.2 meters, for example. This distance value is compared with a computed distance value dc, which is calculated from the known coordinates of the two anchor nodes A4, A7 in the common coordinate system 6. In the exemplary embodiment shown, the calculated distance value dc is also 5.2 meters. If the deviation between the measured distance value dm and the computed distance value dc is less than a predetermined threshold value or if, as in the embodiment shown, both values are the same to the degree of accuracy shown, it is assumed that there is no error with the assigned positions of the first anchor node A4 and second anchor node A7.

The situation is different when the anchor node A6 is taken as the first anchor node. The measured distance from said node to a second anchor node, for example the anchor node A5, is dm=4.2 meters. However, the calculated distance between the two anchor nodes A6, A5 is 15.6 meters. The deviation between the measured value dm and the calculated value dc is more than an example hypothetical threshold value of 0.1 meter. For this reason, the assigned position of the first anchor node A6 or the assigned position of the second anchor node A5, or even the respective positions of the two anchor nodes, can be classified as implausible.

In order to establish which of the two anchor nodes has been provided with implausible position information, further distance measurements are carried out. By comparing the measured values dm and the calculated values dc between the anchor node A6 and the anchor nodes A3 and A7, it can be concluded that the anchor node A6 presents significant deviations between the measured value dm and the calculated value dc with respect to these neighboring anchor nodes as well. However, since the respectively neighboring anchor nodes A3, A5 and A7 do not present any significant deviations between the measured values dm and the calculated values dc with respect to their respective neighbors, it is highly likely that the anchor node A6 has been assigned a false position. For this reason, the position of the anchor node A6 is classified as implausible.

It is possible for a warning message or maintenance message to be generated and issued in the positioning system 2 in response to such an event. For example, the targeted maintenance message for checking the position assignment of the anchor node A6 may be issued. This check may be done by manually recalibrating the anchor node in question. However, it is also possible for the position of the anchor node A6, as explained with reference to FIGS. 1 and 2, to be automatically calculated from the distances to the remaining anchor nodes A1, A2, A3, A4, A5 and A7. This newly calculated value may then be assigned to the anchor node A6.

The previously described checking and correction of the positions of the anchor nodes may take place at regular intervals or be prompted by means of user input. In this way, a high standard of quality can be maintained for the reference system of the positioning system 2. Furthermore, added anchor nodes can be checked in order to check and verify the positions manually assigned to the added anchor nodes.

All named features, including those taken from the drawings alone and also individual features which are disclosed in combination with other features, are considered alone and in combination as essential for the invention. Embodiments according to the invention can be fulfilled by individual features or a combination of several features. Within the scope of the invention, features which are designated with "in particular" or "preferably" are understood to be optional features.

LIST OF REFERENCE NUMBERS

2 Positioning system
4 Mobile unit
6 Coordinate system
A1 . . . A7 Anchor nodes
d1 . . . d3 Distances
d14, d24, d34 Distances
d15, d25, d35, d45 Distances
dm Measured distance
dc Calculated distance

What is claimed is:

1. A positioning system for position determination in a goods logistics facility, the positioning system comprising:
a plurality of anchor nodes installed in fixed locations in the goods logistics facility; and
a central processing unit;
wherein the plurality of anchor nodes includes at least a first anchor node and a second anchor node,
wherein each of said first and second anchor nodes has an assigned position within a common coordinate system,
wherein each of said first and second anchor nodes comprises a transponder configured to determine a measured distance value between the first anchor node and the second anchor node,
wherein the central processing unit is configured to receive the measured distance value and compare the measured distance value with a computed distance value calculated from the assigned position of the first anchor node and the assigned position of the second anchor node,
wherein the central processing unit is configured to determine a deviation between the measured distance value and the computed distance value as a plausibility criterion,
wherein the central processing unit is configured to classify the assigned position of the first anchor node and/or the second anchor node as implausible when the deviation exceeds a predetermined threshold value, and
wherein the central processing unit is configured to generate a message within the positioning system for targeted position maintenance of the first anchor node and/or second anchor node when the assigned position of the first anchor node and/or second anchor node is classified as implausible.

2. The positioning system according to claim 1, wherein each of the plurality of anchor nodes comprises a transponder configured to determine measured distance values to more than one neighboring anchor node, wherein each of the plurality of anchor nodes has an assigned position within the common coordinate system, wherein the central processing unit is configured to receive the measured distance values between a predetermined number of the plurality of anchor nodes and their respective neighboring anchor nodes, wherein the central processing unit is configured to compare the measured distance values of the predetermined number of the plurality of anchor nodes with computed distance values calculated from the assigned positions of the predetermined number of the plurality of anchor nodes, wherein the central processing unit is configured to determine deviations of an individual one of the plurality of anchor nodes between the measured distance values of the predetermined number of the plurality of anchor nodes and the computed distance values calculated from the assigned positions of the predetermined number of the plurality of anchor nodes as a plausibility criterion, wherein the central processing unit is configured to classify the position of the individual one of the predetermined number of anchor nodes as implausible when the deviations exceed predetermined threshold values, and wherein the central processing unit is configured to generate a message within the positioning system for targeted position maintenance of the individual one of the predetermined number of the plurality of anchor nodes when the assigned position of the individual one of the predetermined number of the plurality of anchor nodes is classified as implausible.

3. The positioning system according to claim 2, wherein the plurality of anchor nodes of the position system includes verified anchor nodes whose positions are classified as plausible and at least one added anchor node, wherein the central processing unit is configured to receive and compare measured distance values between the at least one added anchor node and the verified anchor nodes neighboring the at least one added anchor node with computed distance values calculated from the assigned positions of the at least one added anchor node and the verified anchor nodes, wherein the central processing unit is configured to a determine a deviation of the at least one added anchor node between the measured distance values and the computed distance values as a plausibility criterion, wherein the central processing unit is configured to classify a position assigned to the at least one added anchor node as implausible when the measured distance values deviate from computed distance values calculated from positions of the verified anchor nodes neighboring the at least one added anchor node by more than a predetermined threshold value, and wherein the central processing unit is configured to generate a message within the positioning system for targeted position maintenance of the individual one of the predetermined number of the plurality of anchor nodes when the assigned position of the individual one of the predetermined number of the plurality of anchor nodes is classified as implausible.

4. The positioning system according to claim 3, wherein the positioning system is configured to carry out distance measurements upon request.

5. The positioning system according to claim 4, wherein the plurality of anchor nodes comprises a first group of anchor nodes and a second group of anchor nodes, wherein each anchor node in the first group of anchor nodes has an assigned position and each anchor nodes in the second group of anchor nodes does not have an assigned position, and wherein the central processing unit of the positioning system is configured to receive measured distances between a first anchor node of the second group and at least three different anchor nodes of the first group, wherein the central processing unit is configured to calculate a position of the first anchor node of the second group based on the measured distances, and wherein the central processing unit is configured to assign a computed position to the first anchor node of the second group based on the calculated position of the first anchor node of the second group.

6. A method for operating a positioning system in a goods logistics facility that includes a plurality of anchor nodes installed in fixed locations in the goods logistics facility, wherein the plurality of anchor nodes includes at least a first anchor node and at least one second anchor node, wherein each of said first and second anchor nodes comprises a transponder configured to determine a measured distance value between the first anchor node and the second anchor node, and wherein each of said first and second anchor nodes has an assigned position within a common coordinate system, the method comprising:

measuring a distance between the first anchor node and a second anchor node using the transponders to obtain a measured distance value;

comparing the measured distance value with a computed distance value calculated from the assigned position of the first anchor node and the assigned position of the second anchor node within the coordinate system using a central processing unit;

classifying the assigned position of the first and/or second anchor node as implausible when a deviation between the measured distance value and the computed distance value is greater than a predetermined threshold value; and generating a message within the positioning system for targeted position maintenance of the first anchor node and/or second anchor node when the assigned position of the first anchor node and/or second anchor node is classified as implausible.

7. The method according to claim 6, wherein each of a predetermined number of the plurality of anchor nodes and their respective neighboring anchor nodes comprises a transponder, and wherein the method further comprises:

measuring a distance between the predetermined number of the plurality of anchor nodes and their respective neighboring anchor nodes using the transponders;

classifying the position of an individual one of the predetermined number of anchor nodes as implausible when measured distance values between the individual one of the predetermined number of anchor nodes and more than one neighboring anchor node deviate from computed distance values by more than predetermined threshold values; and generating a message within the positioning system for targeted position maintenance of the individual one of the predetermined number of the plurality of anchor nodes when the position of the individual one of the predetermined number of anchor nodes is classified as implausible.

8. The method according to claim 7, wherein the plurality of anchor nodes of the position system includes verified anchor nodes whose positions are classified as plausible and at least one added anchor node, and wherein the method further comprises:

measuring the distance between the at least one added anchor node and verified anchor nodes neighboring the at least one added anchor node using the transponders to obtain measured distance values;

classifying a position assigned to the at least one added anchor node as implausible when the measured distance values deviate from computed distance values calculated from the verified anchor nodes neighboring the at least one added anchor node deviate by more than the predetermined threshold value; and generating a message within the positioning system for targeted position maintenance of the at least one added anchor node when the position assigned to the at least one added anchor node is classified as implausible.

9. The method according to claim 8, wherein the measuring the distance between the at least one added anchor node and verified anchor nodes neighboring the at least one added anchor node is carried out upon request.

10. The method according to claim 9, wherein the plurality of anchor nodes comprises a first group of anchor nodes and a second group of anchor nodes, wherein each anchor node in the first group of anchor nodes has an assigned position and each anchor node in the second group of anchor nodes does not have an assigned position, and wherein the method further comprises:

determining distances between a first anchor node of the second group and at least three different second anchor nodes of the first group using the transponders, calculating a position of the first anchor node of the second group based on the determined distances using the central processing unit, and assigning a computed position to the first anchor node of the second group using the central processing unit.

11. The positioning system according to claim 3, wherein the central processing unit is configured to receive distance measurements from the transponders at regular predefined time intervals.

12. The method according to claim 8, wherein the step of measuring the distance between the at least one added anchor node and verified anchor nodes neighboring the at least one added anchor node is carried out at regular predefined time intervals.

* * * * *